(12) United States Patent
Weisenberg et al.

(10) Patent No.: US 10,408,374 B2
(45) Date of Patent: Sep. 10, 2019

(54) ARTICULATING NECK SPINNER ASSEMBLY FOR APPLYING LINING MATERIALS IN PIPES

(71) Applicants: Kent Weisenberg, Fruit Cove, FL (US); Shane Rowan, Jacksonville, FL (US)

(72) Inventors: Kent Weisenberg, Fruit Cove, FL (US); Shane Rowan, Jacksonville, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 0 days.

(21) Appl. No.: 15/655,042

(22) Filed: Jul. 20, 2017

(65) Prior Publication Data
US 2018/0328527 A1 Nov. 15, 2018

Related U.S. Application Data

(60) Provisional application No. 62/504,043, filed on May 10, 2017.

(51) Int. Cl.
| | |
|---|---|
| *F16L 55/1645* | (2006.01) |
| *B05C 11/10* | (2006.01) |
| *B05C 7/08* | (2006.01) |
| *B29C 48/152* | (2019.01) |
| *B05B 13/06* | (2006.01) |
| *B05D 1/00* | (2006.01) |
| *B05D 1/26* | (2006.01) |
| *B05D 7/22* | (2006.01) |
| *F16L 58/10* | (2006.01) |
| *B05D 1/02* | (2006.01) |
| *B05C 7/02* | (2006.01) |
| *B29L 23/00* | (2006.01) |

(52) U.S. Cl.
CPC ...... *F16L 55/1645* (2013.01); *B05B 13/0636* (2013.01); *B05C 7/08* (2013.01); *B05C 11/1005* (2013.01); *B05D 1/005* (2013.01); *B05D 1/02* (2013.01); *B05D 1/265* (2013.01); *B05D 7/222* (2013.01); *B29C 48/152* (2019.02); *F16L 58/1027* (2013.01); *B05C 7/02* (2013.01); *B05D 2254/04* (2013.01); *B29L 2023/22* (2013.01)

(58) Field of Classification Search
USPC ..... 118/306, 317, 323, 316; 427/181, 427.2, 427/230–240, 427.3, 427.4; 239/223, 239/224, 703; 138/97; 405/184.1, 184.2
See application file for complete search history.

(56) References Cited

U.S. PATENT DOCUMENTS

| 8,468,968 B2* | 6/2013 | Weisenberg | B05D 7/22 118/306 |
|---|---|---|---|
| 2012/0172507 A1 | 7/2012 | Weisenberg et al. | |
| 2016/0273992 A1* | 9/2016 | Frueh | G01M 3/005 |

FOREIGN PATENT DOCUMENTS

KR 101010932 B1 1/2011

* cited by examiner

*Primary Examiner* — Yewebdar T Tadesse
(74) *Attorney, Agent, or Firm* — Thomas C. Saitta

(57) ABSTRACT

A SIPP spraying apparatus for applying a liner material to the inner wall of a pipe, the apparatus having a transport unit, an articulating neck, a spinner assembly, proximity sensors and a plurality of positioning assemblies, wherein the positioning assemblies adjust the position of the spinner assembly as the apparatus moves through the pipe so as to maintain the spinner assembly centered within the pipe.

17 Claims, 4 Drawing Sheets

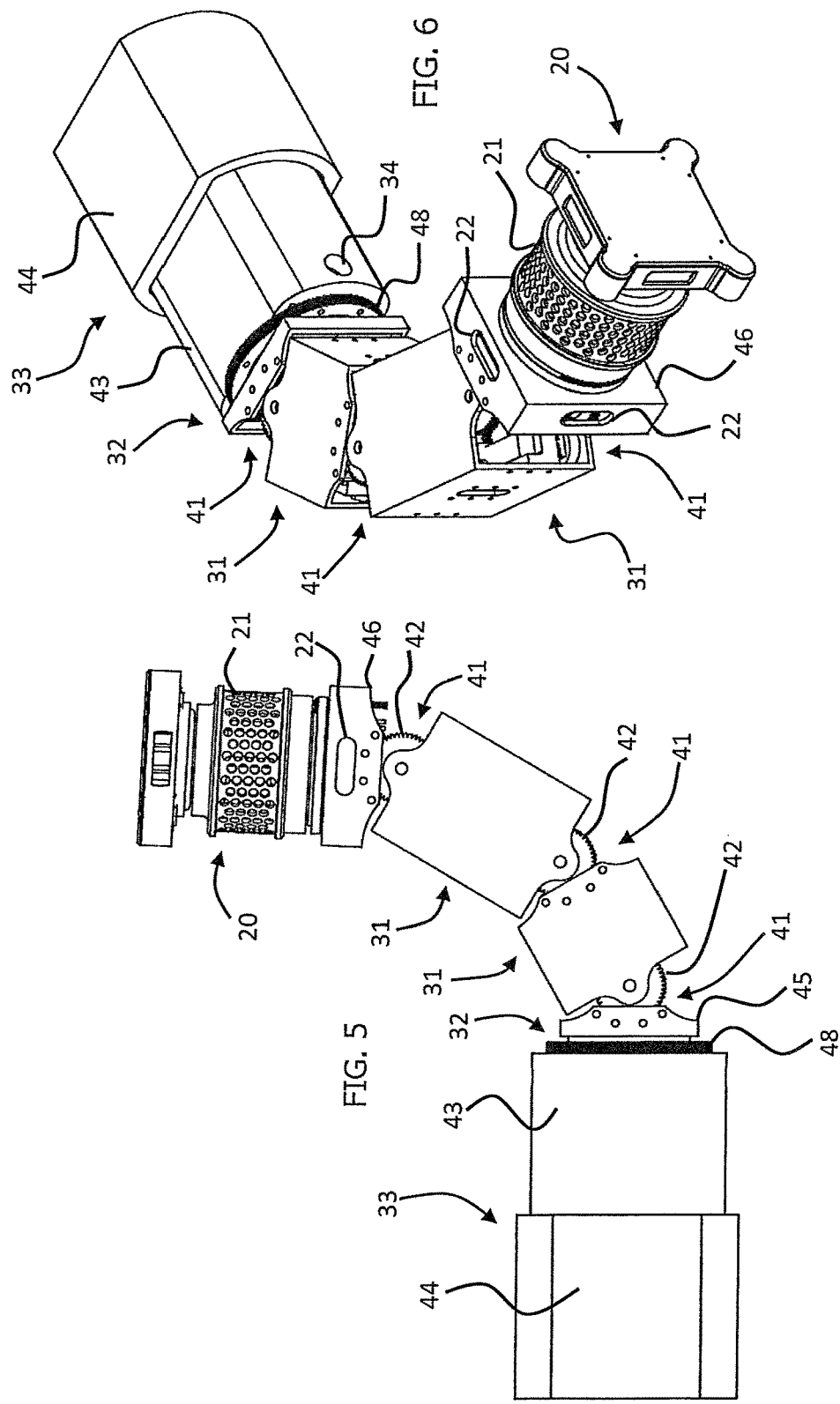

ARTICULATING NECK SPINNER ASSEMBLY FOR APPLYING LINING MATERIALS IN PIPES

This application claims the benefit of U.S. Provisional Patent Application Ser. No. 62/504,043, filed May 10, 2017.

BACKGROUND OF THE INVENTION

This invention applies generally to the field of devices adapted to spray or coat the inner surfaces of a pipe or other member, primarily for the rehabilitation and/or lining of pipes or other tubular members wherein a polymer resin or similar uncured polymer material is sprayed onto the interior wall of the pipe, the sprayed material curing to form a layer possessing desirable properties, such as liquid impermeability, elasticity, rigidity, corrosion resistance, etc. The lining layer may be applied directly to the pipe wall itself, or successive layers may be applied to create multiple layers. The invention relates to such devices which comprise a spraying apparatus that is transported along the interior of the pipe, the sprayer apparatus typically comprising a spinner assembly with a rotating spinner member that receives and distributes the uncured polymer circumferentially as it moves linearly along the pipe, the spinner assembly being mounted onto a transport unit, either self-propelled or towed, that contacts the pipe surface during the operation. More particularly, the invention relates to structures adapted for maintaining the spinner member in the optimum centerline position within the pipe.

Fluid conveyance systems rely on the structural integrity of the pipe to safely and efficiently operate. In the municipal and industrial sectors, there are pipe systems that are degrading such that they fall below standards due to corrosion or crack propagation. These systems include for example the potable water transmission lines to residential areas which can range in sizes of 6 to 48 inches and will typically have complex networks that were installed and modified over many years as the neighborhoods were developed.

There are currently only a few methods to rehabilitate a pipe system to full structural integrity without excavating and replacing pipe segments. The current methods include Cast-In-Place-Pipe (CIPP) and Spray-In-Place-Pipe (SIPP). In the current SIPP methods, a SIPP spraying apparatus traverses the pipe by being pulled by an electrical and resin-supplying tether, known as the umbilical, or through robotic armatures. The spraying apparatus comprises a spinner member that ejects the lining material, such as an uncured or partially cured polymer resin, onto the inner diameter of the pipe, effectively creating a new pipe with a known thickness and structural properties inside the pre-existing pipe. In current systems, the location of the spinner member relative to the centerline of the pipe is determined solely by the geometry of the device, as the spinner assembly is mounted in fixed manner on the spraying apparatus. Having the spinner member coaxially aligned in the center of the pipe is imperative to achieving an even distribution of the lining material, which will guarantee the integrity of the lining process.

There are inherent flaws in relying on the device geometry of the spraying apparatus to center the spinner member. These flaws are the result of obstacles that the device can encounter within nearly every pipe system. The obstacles can include bends, rough terrain (due to joint misalignment or internal weld seams), potential change of pitch at joint, and/or the reaction of the umbilical on the device when extended over long distances (potential for rolling the device due to a torsion on the umbilical). Each of these obstacles will move the centerline of the spinner member off of the centerline of the pipe. This offset can be quite dramatic while transport through a pipe bend and will result in an unknown error of lining thickness in that area, which ultimately yields an unacceptable and potentially unclassifiable final product.

The main objective of this invention is to provide a spraying apparatus, device or assembly adapted to reposition the spinner assembly of the spraying apparatus such that the spinner assembly remains centered within the pipe throughout the lining process, thereby obviating the negative effect of bends and obstacles on lining thickness and consistency. This and other objects are addressed by providing a spraying apparatus with an articulating neck mount and multiple positioning assemblies, the mount adapted to alter the location of the spinner member so as to maintain the spinner member centered within the pipe.

BRIEF DESCRIPTION OF THE DRAWINGS

FIG. 5 is a plan view of the embodiment of FIG. 2 taken from the same perspective as FIG. 3, showing the articulating neck assembly in an extended, non-linear configuration.

FIG. 6 is a perspective view of the embodiment of FIG. 2, showing the articulating neck assembly in an extended, non-linear configuration.

SUMMARY OF THE INVENTION

Figure 1:
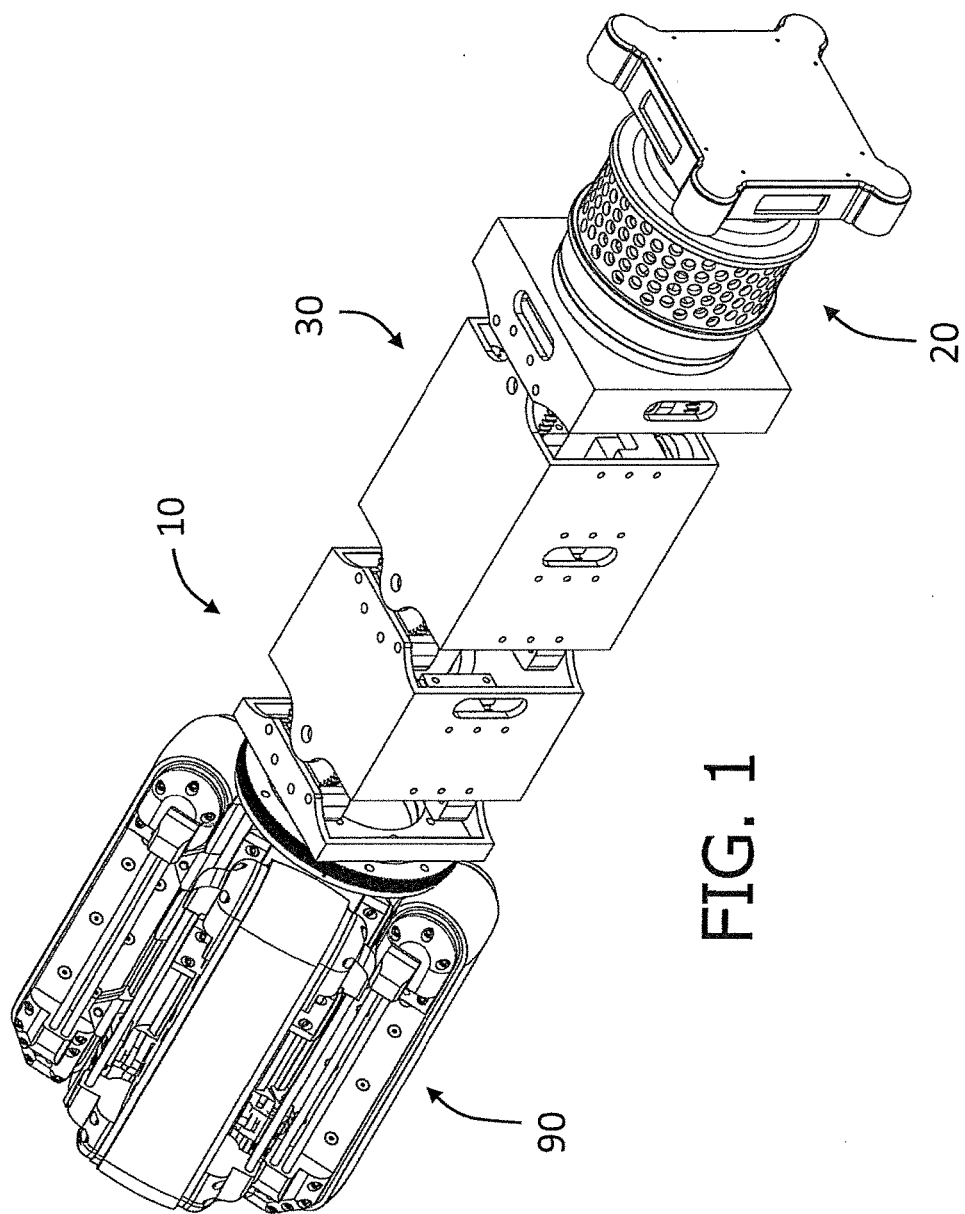
FIG. 1 is perspective view of a representative embodiment of a SIPP spraying apparatus showing the articulating neck assembly as mounted on a self-propelled transport unit.

The invention in various embodiments is a SIPP spraying apparatus adapted to line the interior of a pipe or similar tubular object with a layer of curable material that cures to form a tubular liner or layer within the pipe, or an improvement to a SIPP spraying apparatus, comprising an articulating neck assembly mounted to a transport unit, either self-propelled or towed, and a spinner assembly mounted to the articulating neck assembly. The articulating neck assembly is structured such that the spinner assembly remains positioned on the centerline or a center point of the pipe as it longitudinally traverses the pipe, adapting to bends, curves, angles or other physical changes in the pipe configuration.

The articulating neck assembly comprises a plurality of positioning assemblies that produce up to four degrees of directional movement of the articulating neck assembly and spinner assembly relative to the transport unit. A telescoping assembly extends or retracts the articulating neck assembly and spinner assembly along the central axis. A pitch assembly moves the articulating neck assembly and spinner assembly angularly within a vertical plane containing the centerline of the pipe. A rotational assembly turns the articulating neck assembly and spinner assembly about the central axis of the pipe. A pivoting assembly curves the articulating neck assembly and spinner assembly away from the central axis.

The articulating neck assembly and/or the spinner assembly are provided with radially-oriented proximity or distance sensors in communication with processing and control systems. These determine the location of the spinner assembly relative to the central axis or center point of the pipe as the spraying apparatus traverses the pipe and adjusts the location of the spinner assembly by actuating some or all of the positioning assemblies as needed to maintain its centralized position in response to changes in the pipe configuration.

In alternative language, the invention is a SIPP spraying apparatus comprising a transport unit adapted to move the apparatus through a pipe; an articulating neck assembly mounted to said transport unit; and a spinner assembly mounted to said articulating neck assembly, said spinner assembly adapted to apply a lining material onto the interior of the pipe. Furthermore, the invention wherein said articulating neck assembly comprises a plurality of positioning assemblies, said positioning assemblies adapted to adjust the position of said spinner assembly relative to said transport unit such that said spinner assembly is centered within the pipe as said apparatus moves through the pipe; further comprising radially oriented proximity sensors positioned on said spinner assembly, said proximity sensors in communication with said positioning assemblies; wherein said plurality of positioning assemblies comprises the combination of at least two positioning assemblies chosen from the group of positioning assemblies consisting of a telescoping assembly, a pitch assembly, a rotational assembly and a plurality of pivoting assemblies; wherein the pipe comprises a central axis, and wherein said telescoping assembly is adapted to retract and extend said spinner assembly along said central axis; wherein said pitch assembly angularly raises and lowers said spinner assembly in a vertical plane passing through said central axis; wherein said rotational assembly rotates said spinner assembly about said central axis; wherein said plurality of pivoting assemblies translate said spinner assembly away from said central axis, said plurality of pivoting assemblies pivoting within a single plane; wherein said telescoping assembly is adapted to retract and extend said spinner assembly along said central axis; wherein said pitch assembly angularly raises and lowers said spinner assembly in a vertical plane passing through said central axis; wherein said rotational assembly rotates said spinner assembly about said central axis; and wherein said plurality of pivoting assemblies translate said spinner assembly away from said central axis, said plurality of pivoting assemblies pivoting within a single plane; wherein said plurality of positioning assemblies comprises a telescoping assembly, a pitch assembly, a rotational assembly and a plurality of pivoting assemblies.

Alternatively still, the invention is a SIPP spraying apparatus comprising a transport unit adapted to move the apparatus through a pipe, the pipe having a central axis defining a Y-coordinate and said transport unit defining a base plane, the combination of the pipe and said transport unit defining an X-coordinate normal to said Y-coordinate and parallel to said base plane, and further defining a Z-coordinate normal to said X-coordinate, said Y-coordinate and said base plane; an articulating neck assembly mounted to said transport unit and comprises a plurality of positioning assemblies, said positioning assemblies adapted to adjust the position of said spinner assembly relative to said transport unit such that said spinner assembly is centered within the pipe as said apparatus moves through the pipe; wherein said plurality of positioning assemblies comprises a telescoping assembly, a pitch assembly, a rotational assembly and a plurality of pivoting assemblies; wherein said telescoping assembly is adapted to retract and extend said spinner assembly along said Y-coordinate; wherein said pitch assembly angularly raises and lowers said spinner assembly in a vertical plane along said Z-coordinate; wherein said rotational assembly rotates said spinner assembly about said Y-coordinate; and wherein said plurality of pivoting assemblies translate said spinner assembly away from said Y-coordinate, said plurality of pivoting assemblies pivoting within a single plane; a spinner assembly mounted to said articulating neck assembly, said spinner assembly adapted to apply a lining material onto the interior of the pipe; and radially oriented proximity sensors positioned on said spinner assembly, said proximity sensors in communication with said positioning assemblies.

DETAILED DESCRIPTION OF THE INVENTION

With reference to the drawings, the invention will be described. The drawings are provided for descriptive and illustrative purposes and are not intended to be limiting as to the scope and definition of the invention. The following coordinate system will be referred to herein, wherein the Y-coordinate or direction shall be the direction along the centerline or central axis of the pre-existing pipe, i.e., the longitudinal direction or direction of travel. The X-coordinate or direction shall be normal to the Y-coordinate and parallel to the base or ground plane of the transport unit, i.e., the artificial plane on which the transport units moves, and the Z-coordinate or direction shall be normal to the X-coordinate, Y-coordinate and the base plane. Thus, for a pipe that is horizontally oriented, the base plane will be horizontal, the X-coordinate will be horizontal and the Z-coordinate will be vertical. For a pipe that is inclined 10 degrees from true horizontal, the base plane and the X-coordinate will also be inclined 10 degrees from true horizontal. The term “pipe” is used herein to designate any tubular member, such as for example a concrete or metal pipe, as well as a tubular member defined by a lining previously applied to the interior of another tubular member. Thus, reference to the inner diameter of a pipe as used herein will refer to the actual dimensions of the open bore within the pipe, as a lining layer may already be present within the actual pipe. The term “distal” shall refer to the direction toward the end of the spraying apparatus 10 consisting of the spinner assembly and the term “proximal” shall refer to the direction toward the end of the spraying apparatus 10 consisting of the transport unit 90.

In general, the invention in various embodiments comprises a SIPP spraying apparatus 10 that is transported along the interior of the pipe, the sprayer apparatus 10 comprising a spinner assembly 20 with a rotating spinner member 21 that distributes an uncured polymer or similar lining material circumferentially as it moves linearly along the pipe, the spinning assembly 20 being mounted by an articulating neck assembly 30 onto a grounding or transport unit 90 that travels on the pipe inner surface during the operation, as seen in FIG. 1. The transport unit 90 is provided with wheels, rollers, traction belts or the like that contact the pipe surface, and may be self-propelled or pulled along by a tether or umbilical member. The transport unit 90 is sized or weighted to provide the counterbalance for the cantilevered mass of the spinner assembly 20. The transport unit 90 can house electrical components, processing systems and/or control systems necessary to interpret and send out the proper signals to control movement and positioning of the articulating neck assembly 30, or may comprise means to deliver such signals to external processing and control systems. The transport unit 90 can also house additional device accessories such as UV lights, cameras, batteries, etc. Transport units and spinner assemblies in general are well known in the art.

The spinner assembly 20 is mounted to the transport unit 90 in a manner that allows for movement of the spinner assembly 20 relative to the transport unit 90 by one or more of the positioning assemblies making up the articulating neck assembly 30, such that bends, curves, angles or the like encountered by the transport unit 90 as it moves through the pipe may be accounted for by independent movement of the spinner assembly 20, the positioning assemblies adjusting the spinner assembly 20 to maintain the spinner assembly 20 at a centralized position within the pipe. The positioning assemblies of the articulating neck assembly 30 which accomplish movement of the spinner assembly 20 relative to the transport unit 90 comprise a telescoping assembly 33, a pitch assembly 34, a rotational assembly 32, and/or a plurality of pivoting assemblies 31. Preferably, all of these positioning assemblies are present in the spraying apparatus 10.

Figure 2:
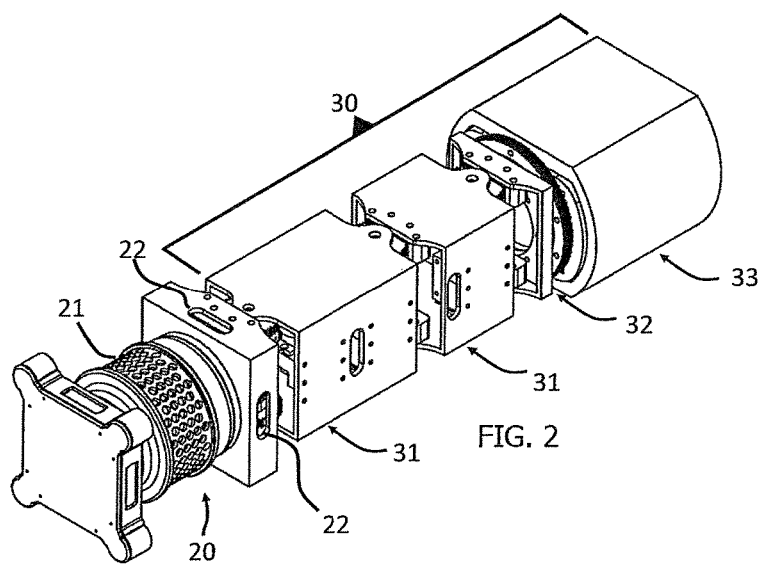
FIG. 2 is a perspective view of a representative embodiment of the articulating neck assembly a sprayer assembly.
Figure 3:
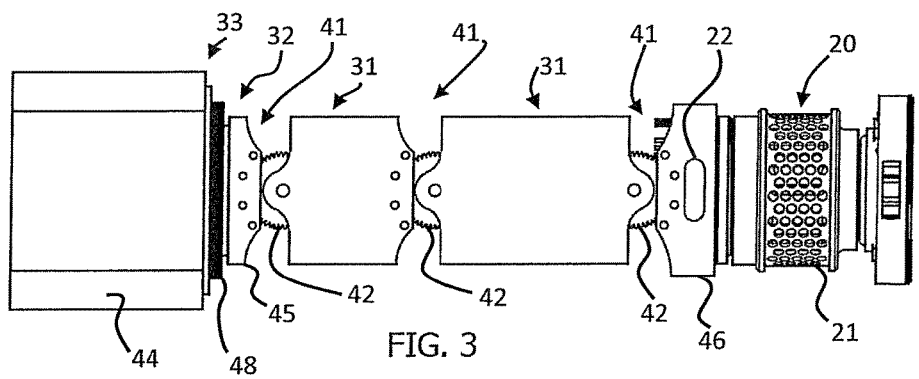
FIG. 3 is a plan view of the embodiment of FIG. 2 showing the articulating neck assembly in a non-extended, linear configuration.
Figure 4:
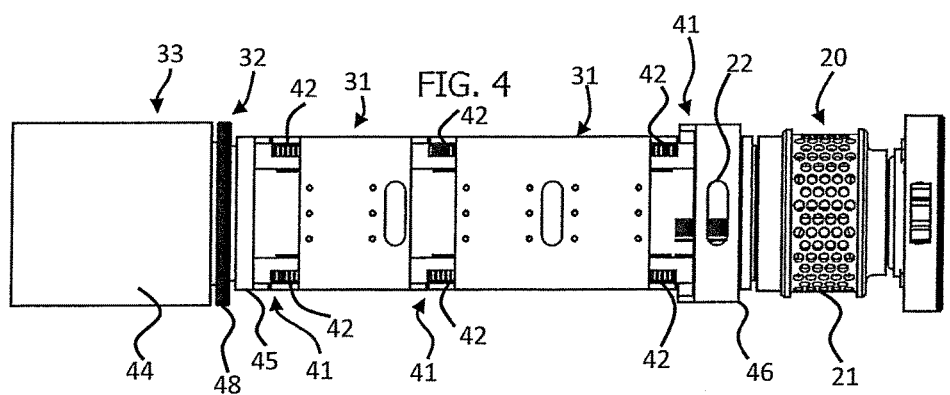
FIG. 4 is a plan view of the embodiment of FIG. 3 as rotated 90 degrees, again showing the articulating neck assembly in a non-extended, linear configuration.
Figure 7:
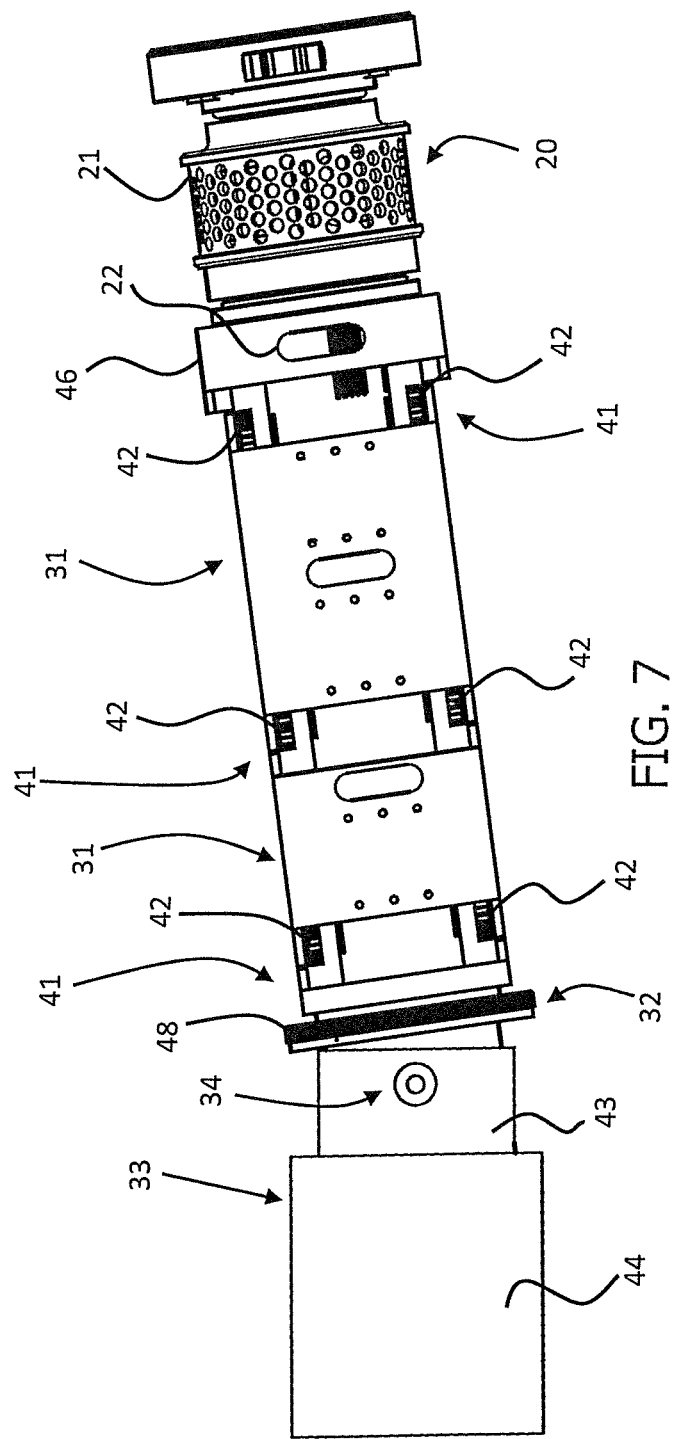
FIG. 7 is a plan view of the embodiment of FIG. 2, showing the articulating neck in an extended, angled, linear configuration.

Telescoping assembly 33 is preferably disposed adjacent the transport unit 90 and comprises a mechanism that translates the remainder distal portion of the articulating neck assembly 30 and the spinner assembly 20 linearly in the Y-coordinate direction, i.e., the telescoping assembly 33 retracts or extends the spinner assembly 20 relative to the transport unit 90. FIGS. 2-4 show the telescoping assembly 33 in the retracted position and FIGS. 5-7 show the telescoping assembly in the extended position. Various electric, hydraulic or pneumatic mechanisms may be utilized to power the telescoping assembly 33, which may comprise for example, servomotors, gears, rack and pinion sets, etc. In the embodiment shown, the telescoping assembly 33 comprises an inner sleeve member 43 and an outer sleeve member 44.

Pitch assembly 34, as seen in FIGS. 6-7, comprises a mechanism adapted to angularly translate the rotational assembly 32, pivoting assembly 31 and spinner assembly 20 in the Z-coordinate direction, i.e., vertically up or down relative to the transport unit 90. In the embodiment shown, the pitch assembly 34 is disposed within the inner sleeve member 43 of the telescoping assembly 33. Various electric, hydraulic or pneumatic mechanisms may be utilized to power the pitch assembly 34, which may comprise for example, servomotors, gears, rack and pinion sets, etc. For example, as the transport unit 90 passes a point where the pipe inclines upward at ten degrees, the transport unit 90 tilts upward ten degrees along the Z-coordinate direction, which if unaccounted for would result in a ten degree downward movement of the spinner assembly 20 at the distal end of the spraying apparatus 10 since the spinner assembly 20 has not yet reached the inclination juncture. Thus, the spinner assembly 20 would no longer be centered within the pipe, and the thickness of the lining material applied by the spinner assembly 20 would not be uniform over this area of the pipe. As this occurs, radially-oriented proximity or distance sensors 22 disposed in the sprayer assembly 20 and/or, as shown in the figures, in the spinner assembly bracket 46 that is used to connect the spinner assembly to the articulating neck assembly 30, provide signals to the processing and control systems to indicate that the spinner assembly 20 is no longer properly centered. The processing and control systems then actuate the pitch assembly 34 to raise the remainder distal portion of the articulating neck assembly 30 (the rotational assembly 32 and the pivoting assemblies 31) and the spinner assembly 20 by ten degrees to account for the change in the base plane resulting from the inclination of the pipe.

The combination of the telescoping assembly 33 and the pitch assembly 34 provides a spraying apparatus 10 that is capable of having an angled trajectory, thereby ensuring that any ridges or valleys in the pipe are accurately coated.

As shown in the figures, rotational assembly 32 is directly connected to the pitch assembly 34 and comprises a mechanism adapted to rotate, spin, roll or twist the remainder distal portion of the articulating neck assembly 30 (the pivoting assemblies 31) and the spinner assembly 20 about the Y-axis. Rotational assembly 32 is directly connected to the most proximal pivoting assembly 31 by rotational assembly bracket 45. Rotational assembly 32 may comprise any suitable electric, hydraulic or pneumatic mechanism, such as for example a planetary gear or the combination 48 of a bearing, a static gear with a through bore, and a pinion gear powered by a motor that will actuate as required. The twist angle can be infinite with the use of an electrical slip ring and fluid rotary union. The rotational assembly 32 will alleviate any issues that may arise in welded joints that are offset along the Z axis.

The combination of the rotational assembly 32 and the pivoting assemblies 31 accounts for the adjustment of the spinner assembly 20 required when a pipe curves or angularly bends in directions other than the Z-coordinate direction, as the centerline of the pipe will be tangent and coincident in 2 points to the Y axis as the transport unit 90 is traversing through bends or angles.

The pivoting assemblies 31 are aligned end-to-end and each comprises one or two articulation mechanisms 41 adapted to angularly pivot each pivoting assembly 31 relative to its adjacent structural component. The most proximal pivoting assembly 31 will be adjacent the rotational assembly 32 and the most distal pivoting member 31 will be adjacent the spinner assembly 20. The pivoting assemblies 31 are arranged such that all will pivot within the same plane, thereby creating a curve or bend in the articulating neck assembly 30. This plane will rotate about the Y-coordinate depending upon the orientation of the rotational assembly 32, as seen in FIGS. 5 and 6. The articulating neck assembly 30 may comprise two pivoting assemblies 31, as shown, but three or more pivoting assemblies 31 could be utilized. The articulation mechanisms 41 may comprise any suitable electric, hydraulic or pneumatic mechanism, such as for example orbital or pivot gears 42.

In the illustrated embodiment, the most proximal pivoting assembly 31 comprises a single articulation mechanism 41 in communication with the rotational assembly 32, while the most distal pivoting assembly 31 comprises a first articulation mechanism 41 in communication with the most proximal pivoting assembly 31 and a second articulation mechanism 41 in communication with the spinner assembly 20 through the spinner assembly bracket 46.

With this structure, the articulating neck assembly 30 is very flexible and bends in the pipe of up to 180 degrees in any direction can be accounted for, since the centralized position of the spinner assembly 20 can be maintained by proper actuation of one, two, three or four of the positioning assemblies.

Radially-oriented proximity or distance sensors 22 may also be located in the pivoting assemblies 31. Sensors 22 can be of any convenient type including ultrasonic, infrared, linear variable displacement transducers or LVDT as "feelers" that run along the pipe wall, or even optical cameras.

The sprayer assembly 20 contains components required to disperse the lining materials in the pipe—a manifold, driving unit, and material accelerator. These components will be cylindrical with their axis collinear with the Y axis. The manifold is designed with an inlet port to attach to the lining material conveyance hoses. The outlets of the manifold most preferably have a combined cross sectional area equal to the inlet area and essentially extrude the material radially outward from the manifold. The outlets of the manifold are arranged such that the area between the inlet port and outlets can be utilized for electrical wiring passage ways. The material accelerator is a spinning component concentric to the manifold but with a dimensional clearance to allow for rotation without interface. The lining material extruded by the manifold will adhere to the material accelerator, then be centrifugally accelerated and projected towards the existing pipe surface. The rotation of the material accelerator, twisting about the Y axis, will be controlled by the driving unit which consists of any necessary bearings, shields, seals, motors, or gearboxes.

The sprayer apparatus 10 is structured to allow for passage of electrical connections, signal communications, fluid conveyances, etc. throughout the apparatus as needed. To accomplish this, ample space within the interior of each positioning assembly must be allocated to this task.

It is understood that equivalents and substitutions for certain elements set forth above may be obvious to those of ordinary skill in the art, and therefore the true scope and definition of the invention is to be as set forth in the following claims.

We claim:

1. A Spray-In-Place-Pipe spraying apparatus comprising:
a transport unit adapted to move the apparatus through a pipe, the pipe having linear and non-linear segments;
an articulating neck assembly mounted to said transport unit; and
a spinner assembly mounted to said articulating neck assembly, said spinner assembly adapted to apply a lining material onto the interior of the pipe;
wherein said articulating neck assembly comprises a plurality of positioning assemblies, said plurality of positioning assemblies adapted to adjust the position of said spinner assembly relative to said transport unit such that said spinner assembly is centered within the pipe as said Spray-In-Place-Pipe spraying apparatus moves through both the linear and non-linear segments of the pipe;
wherein said plurality of positioning assemblies comprises the combination of a plurality of pivoting assemblies and at least one positioning assembly chosen from the group of positioning assemblies consisting of a telescoping assembly, a pitch assembly, and a rotational assembly; and
wherein said plurality of pivoting assemblies pivot within a single plane such that said articulating neck assembly is extended, non-extended and angled by said plurality of pivoting assemblies into either a linear configuration having said plurality of pivoting assemblies in linear alignment or a non-linear configuration having said plurality of pivoting assemblies in non-linear alignment.

2. The Spray-In-Place-Pipe spraying apparatus of claim 1, further comprising radially oriented proximity sensors positioned on said spinner assembly, said proximity sensors in communication with said plurality of positioning assemblies.

3. The Spray-In-Place-Pipe spraying apparatus of claim 2, wherein the pipe comprises a central axis, and wherein said telescoping assembly is adapted to retract and extend said spinner assembly along said central axis.

4. The Spray-In-Place-Pipe spraying apparatus of claim 2, wherein the pipe comprises a central axis, wherein said telescoping assembly is adapted to retract and extend said spinner assembly along said central axis; wherein said pitch assembly angularly raises and lowers said spinner assembly in a vertical plane passing through said central axis; wherein said rotational assembly rotates said spinner assembly about said central axis; and wherein said plurality of pivoting assemblies translate said spinner assembly away from said central axis, said plurality of pivoting assemblies pivoting within a single plane.

5. The Spray-In-Place-Pipe spraying apparatus of claim 2, wherein said plurality of positioning assemblies comprises a telescoping assembly, a pitch assembly, a rotational assembly and a plurality of pivoting assemblies.

6. The Spray-In-Place-Pipe spraying apparatus of claim 5, wherein the pipe comprises a central axis, wherein said telescoping assembly is adapted to retract and extend said spinner assembly along said central axis; wherein said pitch assembly angularly raises and lowers said spinner assembly in a vertical plane passing through said central axis; wherein said rotational assembly rotates said spinner assembly about said central axis; and wherein said plurality of pivoting assemblies translate said spinner assembly away from said central axis, said plurality of pivoting assemblies pivoting within a single plane.

7. The Spray-In-Place-Pipe spraying apparatus of claim 2, wherein the pipe comprises a central axis, and wherein said pitch assembly angularly raises and lowers said spinner assembly in a vertical plane passing through said central axis.

8. The Spray-In-Place-Pipe spraying apparatus of claim 1, wherein the pipe comprises a central axis, and wherein said telescoping assembly is adapted to retract and extend said spinner assembly along said central axis.

9. The Spray-In-Place-Pipe spraying apparatus of claim 1, wherein the pipe comprises a central axis, and wherein said pitch assembly angularly raises and lowers said spinner assembly in a vertical plane passing through said central axis.

10. The Spray-In-Place-Pipe spraying apparatus of claim 1, wherein said at least one positioning assembly comprises a rotational assembly, and wherein said rotational assembly rotates said plurality of pivoting assemblies and said spinner assembly.

11. The Spray-In-Place-Pipe spraying apparatus of claim 1, wherein the pipe comprises a central axis, wherein said telescoping assembly is adapted to retract and extend said spinner assembly along said central axis; wherein said pitch assembly angularly raises and lowers said spinner assembly in a vertical plane passing through said central axis; wherein said rotational assembly rotates said spinner assembly about said central axis; and wherein said plurality of pivoting assemblies translate said spinner assembly away from said central axis, said plurality of pivoting assemblies pivoting within a single plane.

12. The Spray-In-Place-Pipe spraying apparatus of claim 1, wherein said plurality of positioning assemblies comprises a telescoping assembly, a pitch assembly, a rotational assembly and a plurality of pivoting assemblies.

13. The Spray-In-Place-Pipe spraying apparatus of claim 12, wherein the pipe comprises a central axis, wherein said telescoping assembly is adapted to retract and extend said spinner assembly along said central axis; wherein said pitch assembly angularly raises and lowers said spinner assembly in a vertical plane passing through said central axis; wherein said rotational assembly rotates said spinner assembly about said central axis; and wherein said plurality of pivoting assemblies translate said spinner assembly away from said central axis, said plurality of pivoting assemblies pivoting within a single plane.

14. The Spray-In-Place-Pipe spraying apparatus of claim 1, wherein the pipe has a central axis, and wherein with said Spray-In-Place-Pipe spraying apparatus positioned in one of the linear segments of the pipe, said articulating neck assembly in the linear configuration and said spinner assembly centered in the pipe, said plurality of pivoting assemblies are axially aligned on the central axis of the pipe.

15. The Spray-In-Place-Pipe spraying apparatus of claim 14, wherein said plurality of positioning assemblies are axially aligned on the central axis of the pipe.

16. The Spray-In-Place-Pipe spraying apparatus of claim 1, wherein with said Spray-In-Place-Pipe spraying apparatus positioned in one of the non-linear segments of the pipe, said articulating neck assembly in the non-linear configuration and said spinner assembly centered in the pipe, said plurality of pivoting assemblies are not axially aligned with the central axis of the pipe.

17. The Spray-In-Place-Pipe spraying apparatus of claim 14, further wherein with said Spray-In-Place-Pipe spraying apparatus positioned in one of the non-linear segments of the pipe, said articulating neck assembly in the non-linear configuration and said spinner assembly centered in the pipe, said plurality of pivoting assemblies are not axially aligned with the central axis of the pipe.

* * * * *